US006851547B2

(12) United States Patent
Dooley

(10) Patent No.: US 6,851,547 B2
(45) Date of Patent: Feb. 8, 2005

(54) CONVEYOR AND METHOD FOR TRANSPORTING WORKPIECES

(76) Inventor: Richard A. Dooley, 14350 Dirlam Rd., Bowling Green, OH (US) 43402

( * ) Notice: Subject to any disclaimer, the term of this patent is extended or adjusted under 35 U.S.C. 154(b) by 442 days.

(21) Appl. No.: 09/972,509

(22) Filed: Oct. 9, 2001

(65) Prior Publication Data

US 2003/0213675 A1 Nov. 20, 2003

(51) Int. Cl.[7] .............................................. B65G 17/20
(52) U.S. Cl. ................................................... 198/678.1
(58) Field of Search .............................. 198/678.1, 680

(56) References Cited

U.S. PATENT DOCUMENTS

| | | | | | |
|---|---|---|---|---|---|
| 2,802,561 A | * | 8/1957 | Juvinall | ................. | 198/377.06 |
| 3,382,992 A | * | 5/1968 | Couchman, III | ............ | 198/680 |
| 3,863,305 A | * | 2/1975 | Jaarsma | ....................... | 105/242 |
| 4,341,161 A | * | 7/1982 | Morita et al. | ................ | 105/149 |
| 5,226,525 A | * | 7/1993 | Dooley | ........................ | 198/680 |
| 5,253,742 A | * | 10/1993 | Dooley | ........................ | 198/680 |
| 5,829,575 A | * | 11/1998 | Williams | .................. | 198/678.1 |

* cited by examiner

Primary Examiner—Richard Ridley
(74) Attorney, Agent, or Firm—Allen D. Gutchess, Jr.

(57) ABSTRACT

A conveyor for and method of transporting workpieces along a path having a straight portion and a curved portion are provided. Workpieces during certain operations must be maintained a minimum distance apart during transportion. The workpieces, on the curved portion of the conveyor path, are moved outside the conveyor path to enable them to travel greater distances and maintain a minimum spacing without the necessity of spacing them an extra distance apart on the straight portions of the conveyor path. This enables a larger number of workpieces to be handled on a given conveyor or enables a shorter conveyor to be employed for a given number of workpieces.

7 Claims, 4 Drawing Sheets

CONVEYOR AND METHOD FOR TRANSPORTING WORKPIECES

This invention relates to a conveyor and method for transporting large workpieces in spaced relationship.

Frequently, in conveying workpieces in manufacturing operations, a minimum spacing must be maintained between workpieces to prevent touching of edges or corners thereof. This occurs, for example, during cleaning and finishing operations. Heretofore, the spacing of workpieces on straight portions of the conveyor path had to be sufficient to prevent touching of the workpieces on curved portions of the path. It has been found, in accordance with the invention, by moving the workpieces transversely outwardly or outboard of the conveyor path on the curved portions thereof, minimal spacing can be obtained without having excess spacing between the workpieces on the straight portions of the conveyor path. With this arrangement, a given conveyor can handle a larger number of workpieces or a given number of workpieces can be accommodated on a shorter conveyor.

A specific example involves carrying large, generally cubic-shaped workpieces on a conveyor through cleaning and finishing operations during manufacturing. Excess spacing between the workpieces was heretofore needed on straight portions of the conveyor path to prevent touching of the vertical edges when carried along curves. It has been found that additional clearance on the curves between workpieces can be achieved by mounting them on supports at the trailing ends of elongate members or cantilever beams which are supported at other portions by adjacent sets of wheels of a conveyor chain. This unique design causes the workpieces to move tranversely outboard of the conveyor chain when carried along the curves. In a representative application, the spacing between the workpieces can be reduced by about one-fifth while still maintaining the same edge-to-edge clearance between them when on curves of the conveyor.

More specifically, cabinets having generally square transverse cross-sectional shapes, such as washing machine cabinets of generally cubical shape, are supported by workpiece supports positioned on free ends of cantilever members or beams with the length of the overhung ends slightly exceeding the pitch of the chain of the conveyor. The other end of the beam and a central portion thereof are supported by sets of wheels of the conveyor, with the sets of wheels being spaced apart by a distance equalling the chain pitch. On the curve of the conveyor, the overhung ends of the beams and workpiece supports swing outwardly of the conveyor path and center line of the conveyor to distance the corners of the cabinets and prevent them from touching at any time during the travel of the conveyor, through cleaning and finishing operations, for example.

The principles of the invention can also be illustrated by cleaning and finishing operations for wheels of vehicles. In this instance, the workpieces or wheels are carried by workpiece supports below the wheels mounted on the free ends of members or beams carried by a lower conveyor chain. The conveyor chain again has a path with straight and curved portions carrying the workpieces through the operations. In the curved portions of the conveyor path, the free ends of the members swing outwardly of the conveyor path and the center line of the conveyor to move the workpiece supports and the workpieces outwardly of the curved portion. This causes the workpieces to spread apart and again enable them to maintain minimum distances from one another even when the distance between the workpieces on the straight portions of the path are at a desired minimum spacing.

It is, therefore, a principal object of the invention to provide a conveyor and method for moving workpieces with a minimum spacing between them on both straight and curved portions of the conveyor path.

Another object of the invention is to provide a conveyor with elongate members or cantilever beams which support large, bulky workpieces so as to maintain minimal spacing between them even when they are carried on curved paths of the conveyor through manufacturing operations.

Other objects and advantages of the invention will be apparent from the following detailed description of preferred embodiments thereof, reference being made to the accompanying drawings, in which.

Figure 1:
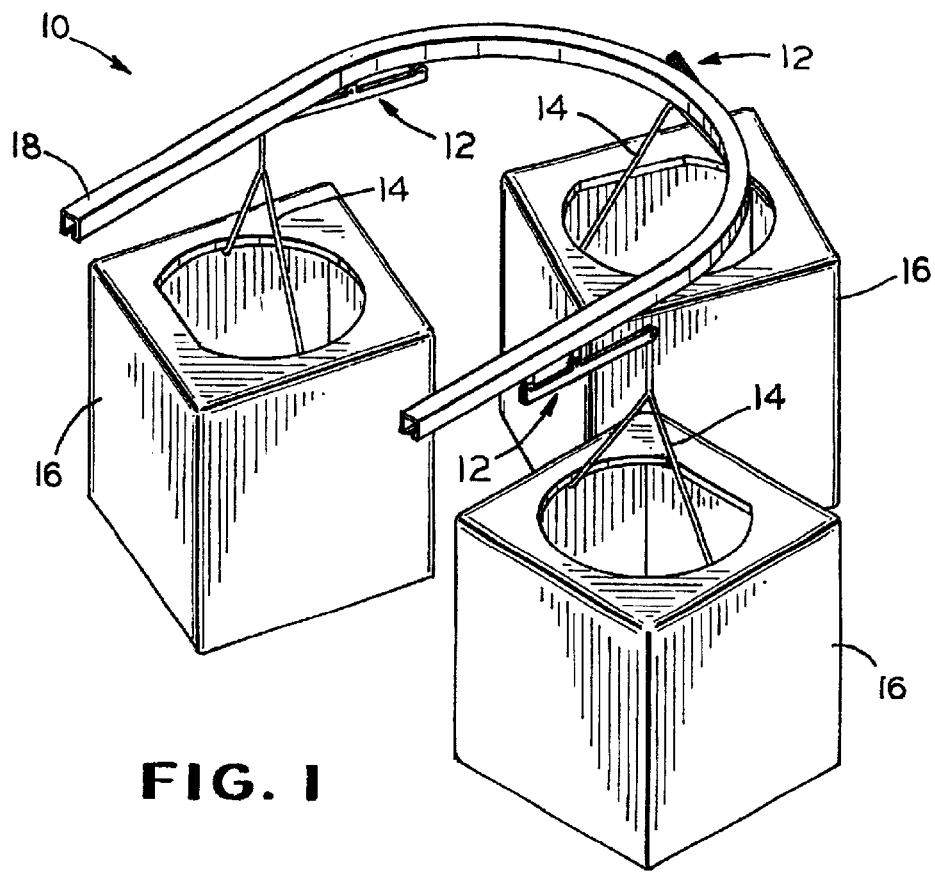
FIG. 1 is a view in perspective of an overhead rail conveyor and workpieces supported below the conveyor by elongate members or cantilever beams.

Referring to the drawings, and more specifically to FIG. 1, an overhead monorail conveyor indicated at 10 is configured in a curve with cantilever or overhung beams or members 12 having hangers or workpiece supports 14 carrying workpieces 16. A conveyor rail or track 18, which is commercially-available, is of inverted, squared, U-shaped configuration with inturned lower edges.

Figure 2:
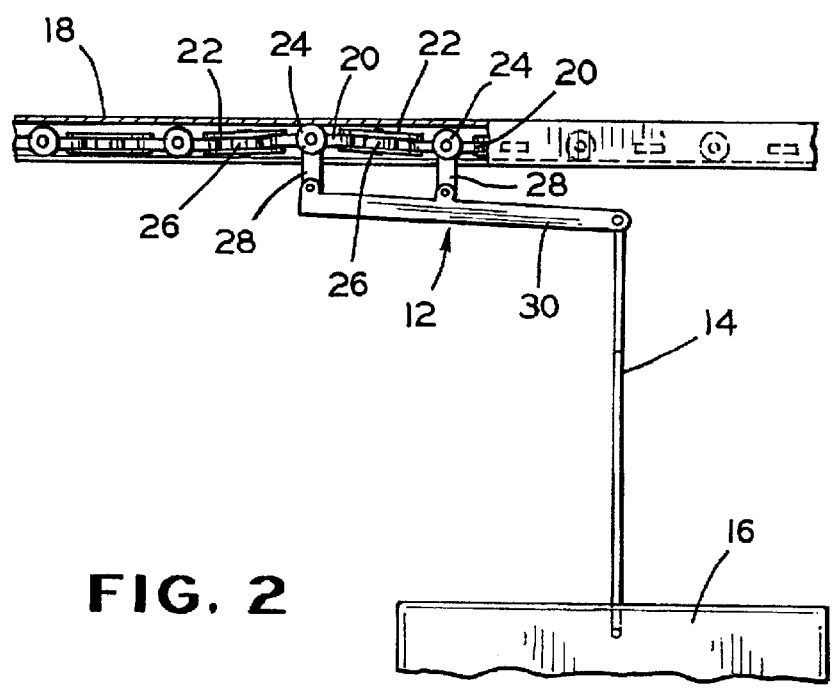
FIG. 2 is a fragmentary side view in elevation, with parts broken away and with parts in cross section, of the overhead conveyor, a workpiece, and a cantilever beam supported by the conveyor.

Referring to FIG. 2, the conveyor 10 further has flexible drive means in the form of links 20 and 22 which are flexibly joined and carry rollers or wheels 24 on horizontal axes and rollers 26 on vertical axes. The wheels 24 carry vertical loads and engage the top and lower inturned edges of the track 18, being shown somewhat exaggerated in FIG. 2. The rollers 26 engage the sides of the track 18 to bear side loads and direct the members 12 and workpiece supports 14 along the conveyor path.

The beam 12 is pivotally supported by H-shaped attachments 28 which are carried by the wheels 24. The attachments 28 pivotally support one end of the beam 12 and an intermediate, central portion of it. An overhung, cantilevered or free end 30 of the beam 12 extends beyond the second set of the wheels 24. With weight on the workpiece supports 14, the wheels 24 at the intermediate portion of the beam ride on the inturned ends of the track 18 and the wheels 24 at the other end of the beam 12 ride upwardly against the top of the track 18, as discussed previously.

Figure 3:
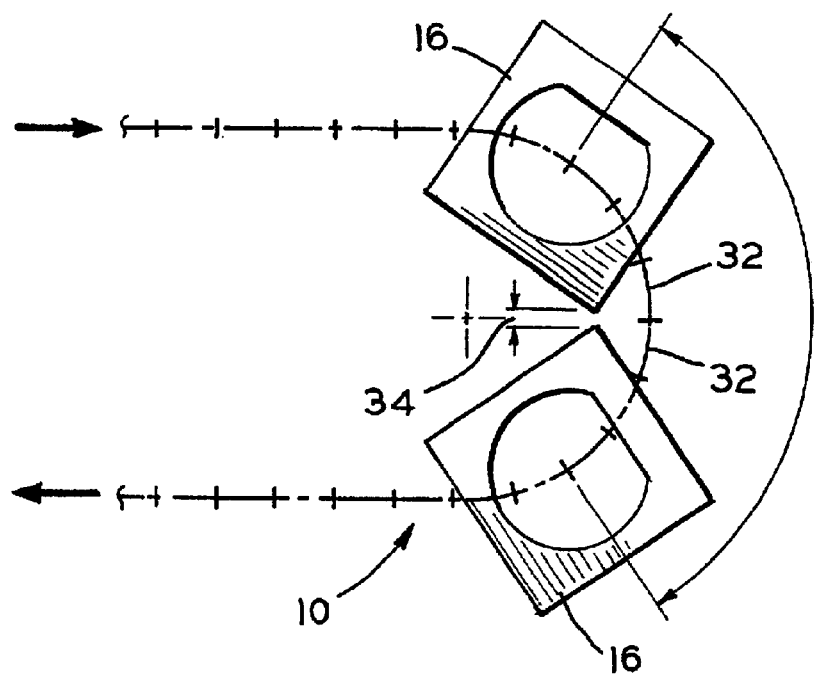
FIG. 3 is a schematic plan view of a conveyor with generally cubic-shaped workpieces, as known in the prior art.

Referring to FIG. 3, the conveyor normally heretofore required the workpieces 16 to be placed apart a sufficient distance so as to have six chain links 32 between the workpiece supports 14. With this arrangment, a minimum distance 34 between the workpieces 16 is of a predetermined amount, with three inches being satisfactory in service use. With the workpiece being a washing machine cabinet, 27 inches by 27 inches, a 48-inch spacing (six chain lengths) is needed in a 180 degree turn, such as may be used in drying and curing ovens.

Figure 4:
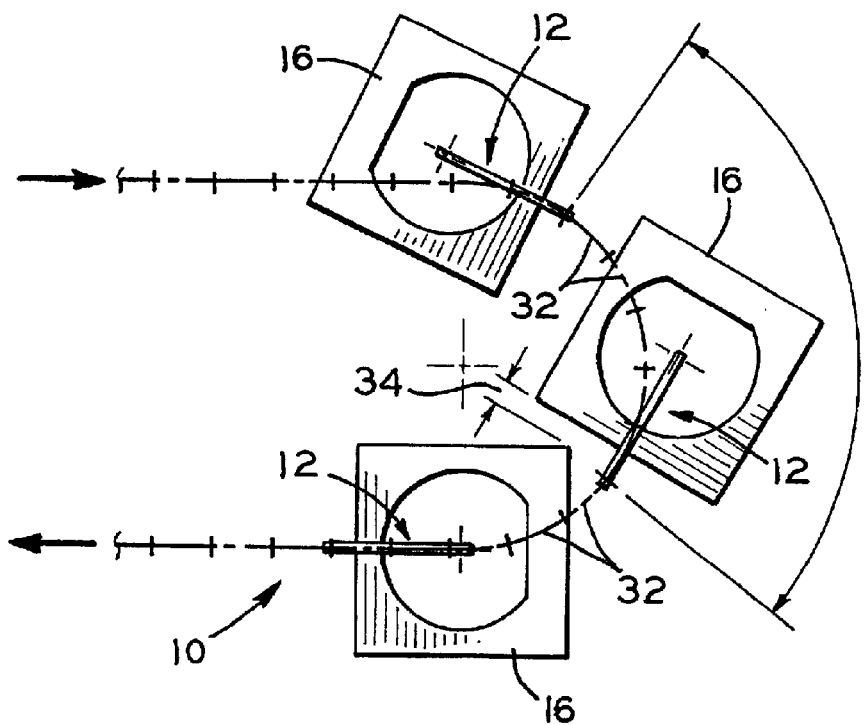
FIG. 4 is a schematic plan view of an overhead conveyor with cubic-shaped workpieces supported by the conveyor through elongate members or cantilever beams.

With the cantilever beams 12, as shown in FIG. 4, the workpieces are moved transversely to positions partially outside or outboard of the center line of the conveyor track 18 on a curve. With the above dimensions, the 48-inch spacing can be reduced to 40 inches (five chain lengths) which results in a 20% production increase while maintaining the minimum distance 34 at three inches.

Figure 5:
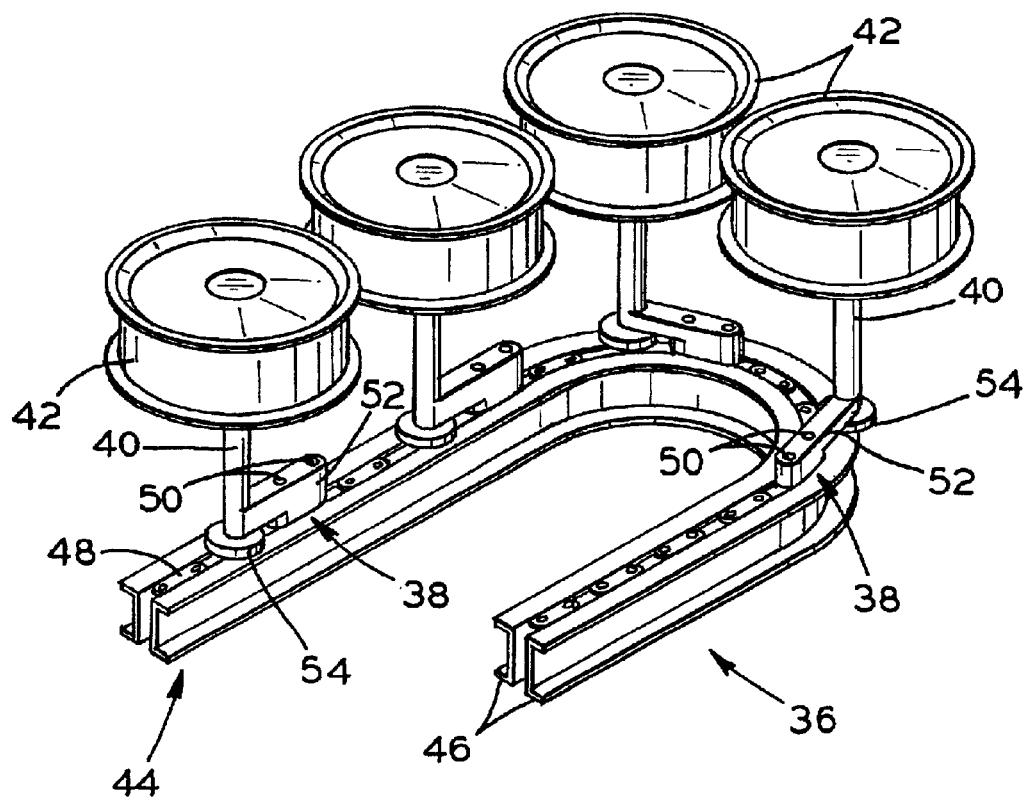
FIG. 5 is a schematic view in perspective of another conveyor and workpieces supported above the conveyor on elongate members.
Figure 6:
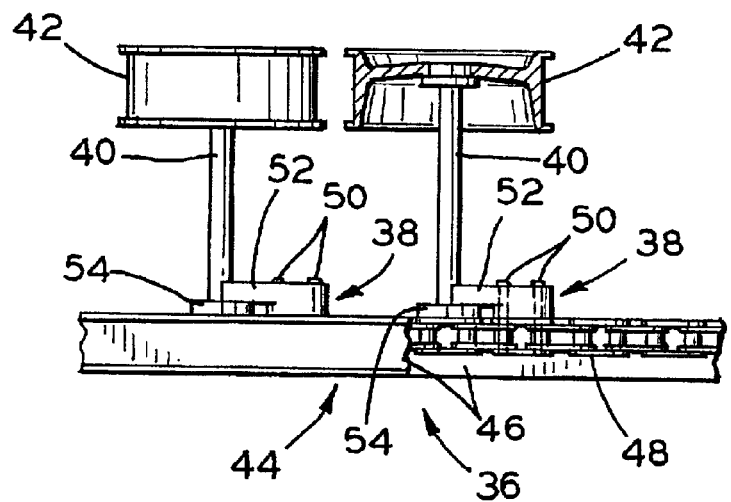
FIG. 6 is a schematic, fragmentary side view in elevation, with parts broken away and with parts in cross section, of the conveyor, workpieces, and elongate members supported on the conveyor.

A modified conveyor 36 embodying the invention is shown in FIGS. 5 and 6. The conveyor is of the chain-on-edge type and includes elongate members 38 having workpiece supports 40 carrying workpieces 42.

A conveyor track 44 includes two channel beams 46 in spaced, back-to-back relationship. The track 44 guides flexible drive means in the form of a link chain 48 along a path which includes straight and curved portions. The link chain 48 has rollers which contact opposite surfaces of the beam 46.

The elongate members 38 have spaced portions connected by pins or axles 50 extending through rollers of the chain 48. Free or overhung ends 52 of the elongate members 38 are suitably affixed to the workpiece supports. In this instance, the free ends 52 of the members are supported on upper flanges of the beams 46 by disc supports 54 which are affixed to the free ends 52 or the workpiece supports 40, sliding along the upper surfaces of the channel beams 46. For lighter workpieces the disc supports 54 are not needed.

With this arrangement, the discs 54, when used, along with the workpiece supports 40 and the free ends 52 can move transversely outwardly from the curved portion of the conveyor path. Two of the free ends 52 of the elongate members 38 are shown in such positions in FIGS. 5 and 8.

Figure 7:
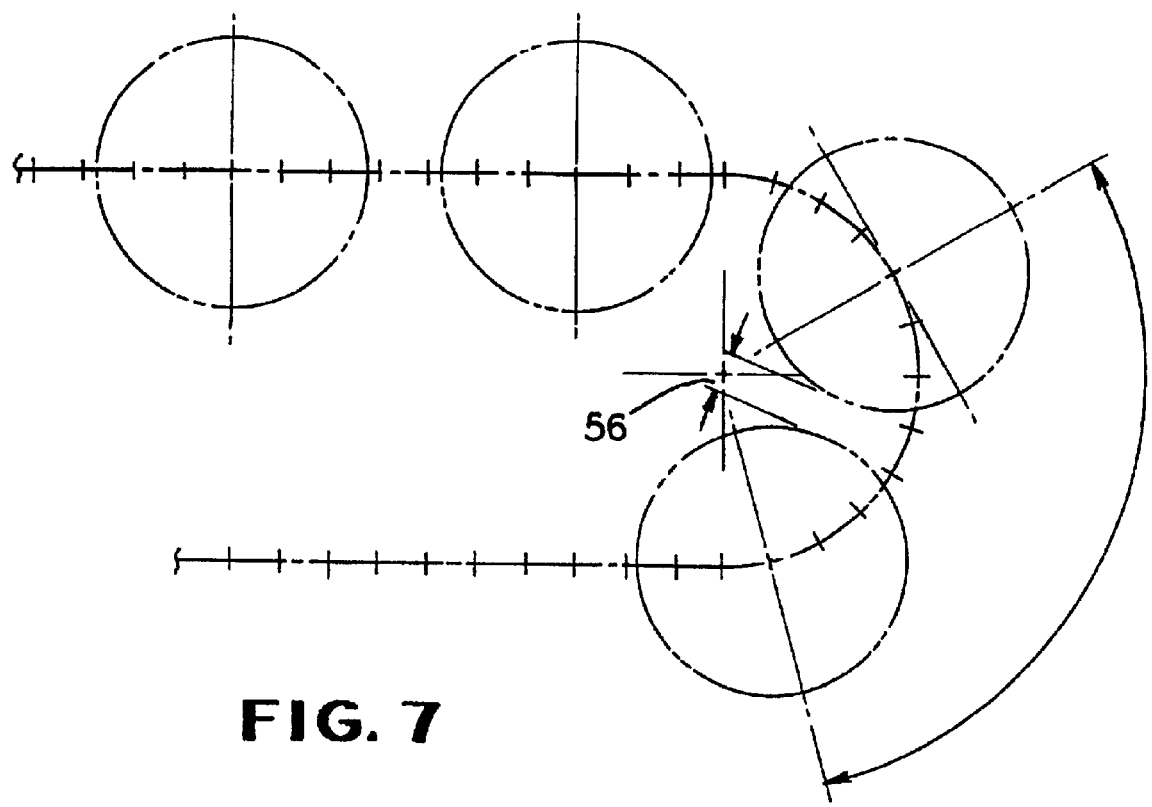
FIG. 7 is a schematic plan view of a conveyor with round workpieces, as is known in the prior art.
Figure 8:
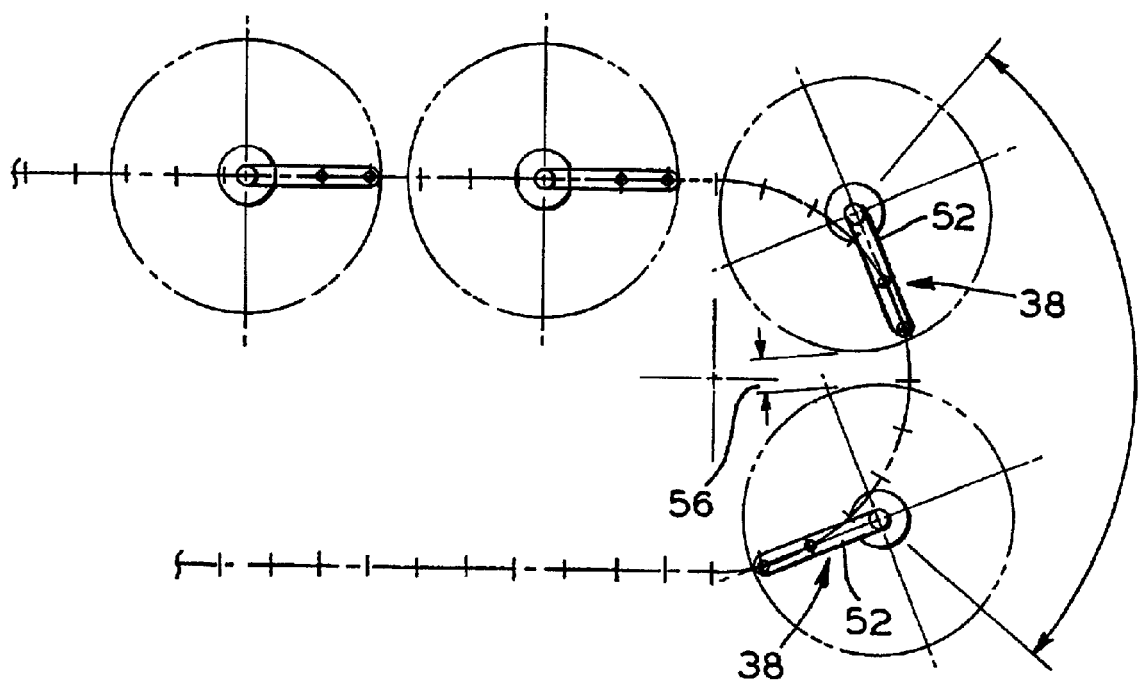
FIG. 8 is a schematic plan view of a conveyor with round workpieces supported by the conveyor through elongate members in accordance with the invention.

This unique movement allows the paths of the workpieces 42 to be outside the conveyor path, when on the curved portions thereof, whereby the workpieces move on a longer curve than the conveyor path itself. This enables the workpieces to maintain a desired minimum spacing 56 on the curved portion of the conveyor path, as shown in FIG. 8, without requiring excess spacing between the workpieces when on the straight portions of the conveyor path as shown in FIG. 7.

While the workpieces have been shown as wheels and washing machine cabinets, of course other bulky items such as filing cabinets, furnace housings and air conditioning shells, and large electrical boxes can advantageously be used with the conveyor according to the invention. While workpieces which are bulky are particularly beneficial when used with the conveyor design, if the workpieces have a round or generally square transverse cross section, the above benefits will also be achieved.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A conveyor for carrying workpieces along a path which includes a straight portion and a curved portion, said conveyor comprising rail means having a straight portion and a curved portion, a flexible conveyor drive having means disposed for engagement with opposite surfaces of said rail means to be directed along said straight portion and said curved portion of said rail means, an elongate member having a free end, first support means moved by said conveyor drive and supported by said rail means at an intermediate portion of said elongate member, second support means supporting an end of said elongate member opposite said free end and spaced a fixed distance from said first support means, said second support means being moved by said conveyor drive and supported by said rail means, with said free end of said elongate member spaced from said conveyor drive, whereby said free end can move transversely of said rail means and said conveyor drive when on the curved portion of said rail means, and a workpiece support carried by said free end of said member for supporting a workpiece.

2. A conveyor according to claim 1 wherein said first support means supports said elongate member at a central portion thereof.

3. A conveyor according to claim 1 characterized by said elongate member being supported below said rail means.

4. A conveyor according to claim 1 characterized by said elongate member being supported above said rail means.

5. A conveyor according to claim 4 characterized by means movably supporting said free end of said elongate member on said rail means.

6. A conveyor for carrying workpieces along a path which includes a straight portion and a curved portion, said conveyor comprising rail means having a straight portion and a curved portion, a flexible conveyor drive having means disposed for engagement with opposite side surfaces of said rail means to be directed along said straight portion and said curved portion of said rail means, said rail means also having upper and lower supporting surfaces, an elongate, cantilevered member having a free end, first support means supporting a central portion of said elongate member, second support means supporting an end of said elongate member opposite said free end and spaced a fixed distance from said first support means, said first and said second support means being connected by said conveyor drive and supported by the upper and lower surfaces of said rail means, with said free end of said elongate member spaced from said conveyor drive, whereby said free end of said elongate member can move transversely of said rail means and said conveyor drive when on the curved portion of said rail means, and a workpiece support carried by said free end of said elongate member for carrying a workpiece with said first support means engaging the lower surface of said rail means and with said second support means engaging the upper surface of said rail means.

7. A conveyor according to claim 6 characterized by said elongate member being supported below said rail means.

* * * * *